US009807080B2

United States Patent
Otranen et al.

(10) Patent No.: US 9,807,080 B2
(45) Date of Patent: Oct. 31, 2017

(54) METHOD AND APPARATUS FOR PROVIDING AUTHENTICATION SESSION SHARING

(71) Applicant: Nokia Technologies Oy, Espoo (FI)

(72) Inventors: Jari Otranen, Espoo (FI); Anssi Karhinen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/091,293

(22) Filed: Apr. 5, 2016

(65) Prior Publication Data

US 2016/0219042 A1 Jul. 28, 2016

Related U.S. Application Data

(63) Continuation of application No. 12/707,941, filed on Feb. 18, 2010, now abandoned.

(51) Int. Cl.
| | |
|---|---|
| *H04L 29/06* | (2006.01) |
| *H04W 12/06* | (2009.01) |
| *H04W 12/08* | (2009.01) |
| *H04W 4/18* | (2009.01) |

(52) U.S. Cl.
CPC .......... *H04L 63/0815* (2013.01); *H04L 63/10* (2013.01); *H04W 12/06* (2013.01); *H04W 12/08* (2013.01); *H04L 63/08* (2013.01); *H04L 63/083* (2013.01); *H04L 63/0838* (2013.01); *H04L 63/0861* (2013.01); *H04W 4/18* (2013.01)

(58) Field of Classification Search
CPC ... H04L 63/08; H04L 63/0815; H04L 63/083; H04L 63/0838; H04L 63/10; H04L 63/0861; G06F 21/31; G06F 21/30; G06F 21/41; H04W 4/18; H04W 12/06; H04W 12/08
See application file for complete search history.

(56) References Cited

U.S. PATENT DOCUMENTS

| | | | |
|---|---|---|---|
| 7,509,672 B1 | 3/2009 | Horwitz et al. | |
| 8,099,766 B1 * | 1/2012 | Corbett | H04L 67/1097 726/6 |
| 2008/0046983 A1 * | 2/2008 | Lester | G06F 21/31 726/5 |

OTHER PUBLICATIONS

Office Action for corresponding European Patent Application No. 11744313.5-1853, dated Nov. 30, 2016, 8 Pages.

* cited by examiner

*Primary Examiner* — Jung Kim
*Assistant Examiner* — Ayoub Alata
(74) *Attorney, Agent, or Firm* — Ditthavong & Steiner, P.C.

(57) ABSTRACT

An approach is provided for providing authentication session sharing between browsers and run time environments in network communication. An interface receives an authentication context associated with a first service. The interface causes, at least in part, storage of the authentication context in a first cache associated with the interface. The interface causes, at least in part, population of the authentication context to a second cache associated with a second service. The second cache is not directly linked to the interface. The authentication context in the second cache authenticates access to the second service.

17 Claims, 9 Drawing Sheets

500

METHOD AND APPARATUS FOR PROVIDING AUTHENTICATION SESSION SHARING

CROSS-REFERENCE TO RELATED APPLICATION

This application is a continuation-in-part of U.S. application Ser. No. 12/707,941, filed Feb. 18, 2010, titled METHOD AND APPARATUS FOR PROVIDING AUTHENTICATION SESSION SHARING, the entire disclosure of which is hereby incorporated by reference herein in its entirety.

BACKGROUND

Network service providers and device manufacturers are continually challenged to deliver value, convenience, and security to consumers by, for example, providing compelling network services. It is noted that the number and variety of applications provided on user devices is continually growing. For example, modern user devices can include several applications (e.g., browsers, client applications, etc.) that enable a user to access network services provided by different application servers. Convenience and security of access to these servers are important challenges that service providers face every day. Accordingly, in one embodiment, authentication servers can be used to provide security for such applications to access application servers. Traditionally, authentication information between browser applications and different client applications is not shared, therefore, network resources can be wasted and user experience can be diminished when an authentication process is repeated for different applications accessed from the same device.

SOME EXAMPLE EMBODIMENTS

Therefore, there is a need for an approach for providing authentication session sharing between different applications (such as, but not limited to, browsers and run time environments).

According to one embodiment, a method comprises receiving, at an interface, an authentication context associated with a first service. The method also comprises causing, at least in part, storage of the authentication context in a first cache associated with the interface. The method further comprises causing, at least in part, population of the authentication context to a second cache. The second cache is associated with a second service and the second cache is not directly linked to the interface. The authentication context in the second cache authenticates access to the second service.

According to another embodiment, an apparatus comprising at least one processor, and at least one memory including computer program code, the at least one memory and the computer program code configured to, with the at least one processor, cause, at least in part, the apparatus to receive an authentication context associated with a first service. The apparatus is also caused to cause, at least in part, storage of the authentication context in a first cache associated with the apparatus. The apparatus is further caused to cause, at least in part, population of the authentication context to a second cache. The second cache is associated with a second service and the second cache is not directly linked to the apparatus. The authentication context in the second cache authenticates access to the second service.

According to another embodiment, a computer-readable storage medium carrying one or more sequences of one or more instructions which, when executed by one or more processors, cause, at least in part, an apparatus to receive an authentication context associated with a first service. The apparatus is also caused to cause, at least in part, storage of the authentication context in a first cache associated with the apparatus. The apparatus is further caused to cause, at least in part, population of the authentication context to a second cache. The second cache is associated with a second service and the second cache is not directly linked to the apparatus. The authentication context in the second cache authenticates access to the second service.

According to another embodiment, an apparatus comprises means for an authentication context associated with a first service. The apparatus also comprises means for causing, at least in part, storage of the authentication context in a first cache associated with the apparatus. The apparatus further comprises means for causing, at least in part, population of the authentication context to a second cache. The second cache is associated with a second service and the second cache is not directly linked to the apparatus. The authentication context in the second cache authenticates access to the second service.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing authentication session sharing between browsers and run time environments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term network resource refers to any service or data structure or communication link available through connection to a network. A single sign-on (SSO) process refers to any process of a single provider, which enables a user, during one session connected to the network, to access a plurality of network resources from that provider without redundant entry by the user of user identification or authentication information. A single provider is often identified by a single network domain name in the uniform resource identification (URI) naming system, as used for example with a uniform resource locator (URL) naming system. However, it also contemplated that the SSO process can extend to services provided over multiple network domains. An example single sign-on process is the single sign-on processes for the OVI™ system of the NOKIA CORPORATION™ of Espoo, Finland. An access provider is a network service provider that grants access for user equipment (e.g., UE 101, described below) to access a network (e.g., communication network 105, described below).

Figure 1:
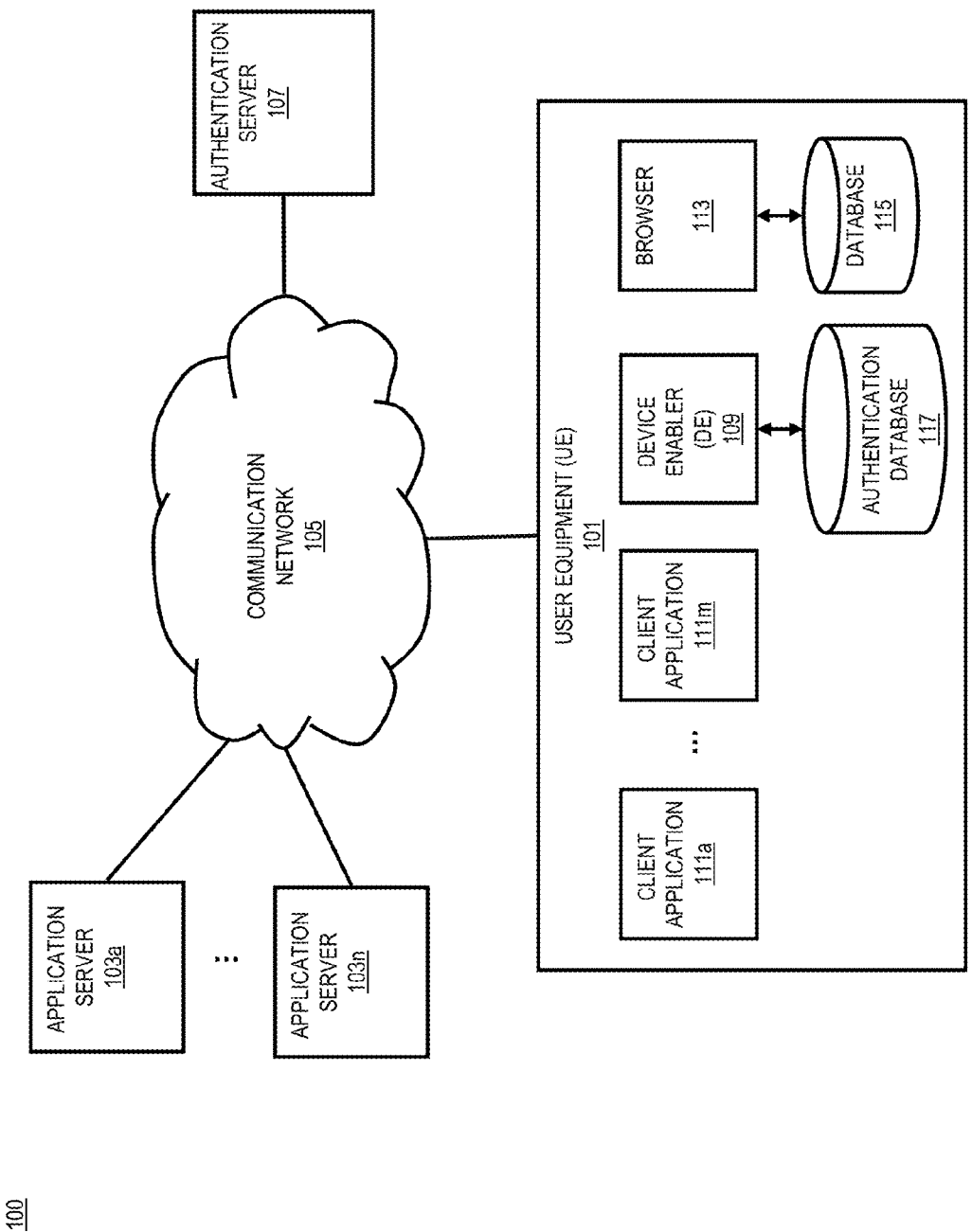
FIG. 1 is a diagram of a system capable of providing a platform to share authentication session information, according to one embodiment.

FIG. 1 is a diagram of a system capable of providing authentication session sharing, according to one embodiment. Applications (such as, but not limited to, applications executing in run-time environments (e.g., Java runtime, Web runtime, etc.), browsers, etc.) can be executed on user devices to enable access to services provided by application servers. As previously noted, the number and variety of these client applications are continually increasing; and security and convenience of access to the application servers through the client applications are important challenges facing service providers. Traditionally, for each client application (e.g., a browser or client application) to access an application server, the client application (and/or a user of the client application) needs to authenticate itself to an authentication server to receive an authentication context. The authentication context is further used by the client application to access the server application. However, this authentication context is not traditionally shared between different types of client applications. Therefore, each client application type performs its own authentication process to access the application servers, for instance, even when accessing the same servers or when the application servers provide related services. This can waste network resources by causing potentially high traffic loads on participating application servers and authentication servers, thereby diminishing user experience. For example, an authentication context historically is not shared between an application that runs in a run time environment and a client application such as browser. Therefore, even if a run time client application has been authenticated and an authentication context exists, when a user uses a browser to access the same or related application server (such as a web server), the user and/or the browser performs another authentication process to obtain an authentication context specific to the browser. This repeated authentication can result in potentially high traffic loads on participating authentication server.

To address these problems, a system 100 of FIG. 1 can advantageously provide a platform to share authentication session information, such as authentication context, between different applications such as client applications running in run time environments and client applications such as browsers. As used herein, the term "authentication context" can include: (1) information regarding initial identification mechanisms of a user, client, customer, etc.; (2) information regarding authentication mechanism or method (e.g., passwords, one time password, a cookie, a limited use key, a secret key, a consumer key, an access token, etc.); (3) information regarding storage and protection of credential (e.g., password rules, smart carts, etc.); and the like.

According to an embodiment of FIG. 1, a user equipment (UE) 101 can communicate with multiple network resources, including application servers 103*a*-130*n* (collectively referenced hereinafter as application servers 103), through, for example, communication network 105. In one example, authentication server 107 can be used to identify, authentication, and/or verify the UE 101, a user of the UE 101, client applications, browsers, etc., associated with the UE 101, for access to application servers 103. The UE 101 can include an interface, such as device enabler (DE) 109, which can provide a platform to share authentication session information, such as authentication context, between, for example, client applications 111*a*-111*m* (collectively referenced hereinafter as client applications 111) and the browser 113. According to an embodiment, when one of the client applications 111 is authenticated with the authentication server 107 through the DE 109, an authentication context can be received, for example, at the DE 109 and the authentication context can then be cached and/or stored at, for example, a cache and/or an authentication database 117 associated with the DE 109. The DE 109 can advantageously cause population of the authentication context from, for example, the cache and/or authentication database 117 associated with the DE 109 to another cache and/or database, such as database 115, which is not directly linked to the DE 109. According to one embodiment, this method can be a push method wherein the authentication context from the authentication database 117 is transmitted or caused to be transmitted to the database 115 without a specific request from the database 115 or application associated with the database 115 (e.g., the browser 113). In this example, the browser 113 can use the populated authentication context from the cache and/or database 115 to access the application servers 103 without the need for further authentication.

Figure 7:
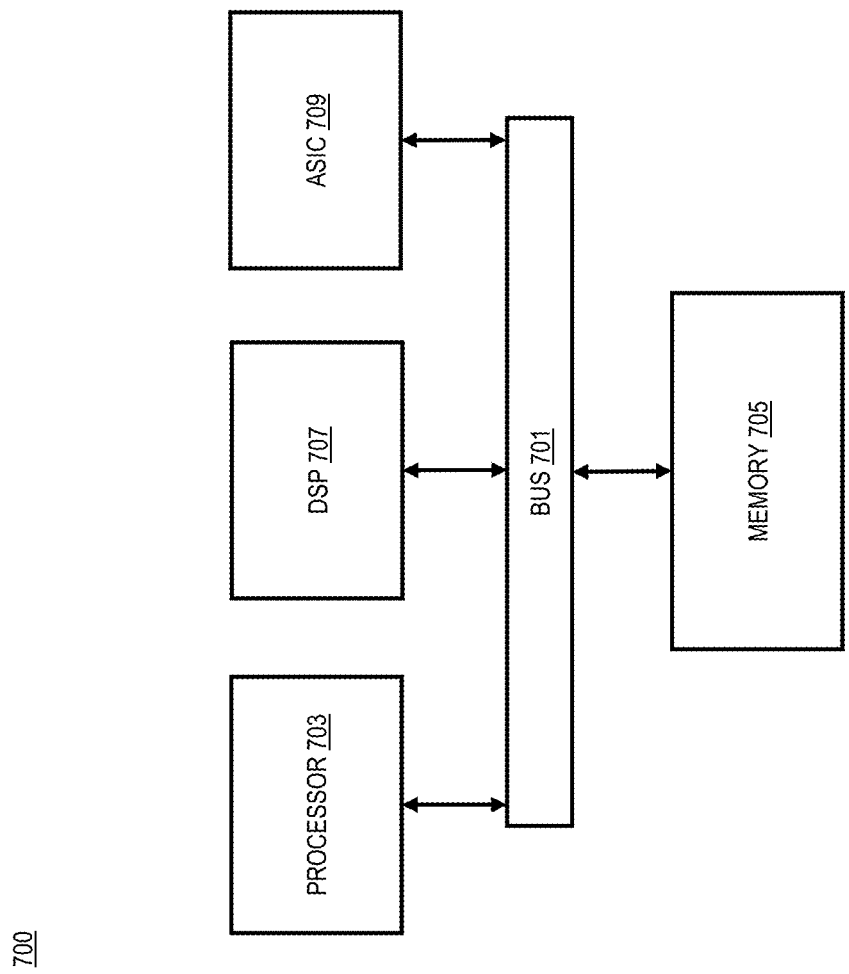
FIG. 7 is a diagram of a chip set that can be used to implement an embodiment of the invention.

According to certain embodiments, one of the client applications 111, for example, client application 111*a*, desires to access the application servers 103. An interface, such as the DE module 109, which may be implemented as a chip set as shown in FIG. 7 and described below, with or without one or more computer program instructions, can receive an authentication request from the client application 111*a*. The authentication request can be used to authenticate the client application 111*a*, a user of the client application 111*a*, or a combination thereof. In one example, the DE 109 determines whether the client application 111*a*, a user of the client application 111*a*, or a combination thereof, has already been authenticated to access the requested application server 103 in a current session over the communication network 105. If the DE 109 determines that an authentication is necessary (e.g., if the user has not yet been authenticated), a user interface (UI) is generated and a user of the client application 111*a* is prompted for inputs employed to identify and authenticate the user. In one embodiment, the determination that an authentication is necessary can be based on lack of an authentication context for the client application 111*a* and/or a user of the client application 111*a*, an outdated authentication context, etc. In one example, the DE 109 can initiate the UI to prompt the user for user authentication and/or identification inputs. Alternatively or additionally, the authentication server 107 can initiate the UI.

User input, which can include, but are not limited to, user credentials is received by the interface DE 109. The user credentials can include username, password, biometrics, one time password, network address filtering, etc. However, it is contemplated that other authentication and/or identification schemes can be used. The DE 109 generates an authentication request for the client application 111*a* and/or a user of the client application 111*a* and conveys the authentication request to the authentication server 107. The authentication server 107 determines if the client application 111*a* and/or a user of the client application 111*a* can be authenticated based, at least in part, on the user inputs, such as user credentials. If the authentication fails, the authentication server 107 informs the DE 109 of the failed authentication and the DE 109 returns the result of the authentication to the client application 111*a*. However, if the authentication is successful (e.g., the user credentials are valid), the authentication server 107 generates and returns a valid authentication context to the DE 109. In one example, the success of the authentication is determined by the authentication server 107 by comparing the received user credentials with user credentials stored in a database (not shown) associated with the authentication server 107. However, it is contemplated that other authentication schemes and protocols can be used to authenticate the client applications 111 and/or user(s) of the client applications.

When the DE 109 receives the valid authentication context, in case of a successful authentication, the DE 109 informs the client application 111*a* that the authentication has been successful. Further, the DE 109 can cache and/or store the received authentication context in a cache and/or database, such as authentication database 117 that is associated with the DE 109. Therefore, if other client applications that are associated with the DE 109 (such as client applications 111) request authentication from the DE 109, the existence and validity of the stored authentication context can be checked by the DE 109 and authentication response can be sent to the requesting client application without further contacting the authentication server 107.

Further, the DE 109 can advantageously cause population of the authentication context cached and/or stored in authentication database 117 in another cache and/or database, which is not directly linked with and/or utilizes the DE 109 (such as database 115). In one example, this population of the authentication context provides the platform for sharing authentication session information between applications that utilize the DE 109 and applications that do not use the DE 109 (such as browser 113). Therefore, if the browser 113 desires to access the application server 103, the browser 113 can utilize the populated authentication context in, for example, the database 115 to authenticate itself (and/or its user) to the application servers 103. By way of example, the database 115 can be a cookie store accessible by the browser 113. In this way, the browser 113 need not perform an additional authentication because the authentication context would already be available in the cookie store (e.g., database 115). Moreover, the browser 113 (or other similar client application) need not be aware of the transfer or population of the authentication context from the DE 109. Instead, the browser 113 need only check for the presence of the authentication context in the cookie store or cache where it normally stores such authentication contexts.

In one example, populating the authentication context between the databases 115 and 117 can include copying the authentication context from the authentication database 117 to the database 115. Additionally or alternatively, populating the authentication context can include converting the authentication context received for the client application 111*a* to another authentication context based, at least in part, on an authentication protocol associated with, for example, the browser 113 and caching and/or storing the converted authentication context in the cache and/or database 115. In one example, the authentication context received for the client application 111*a* can include a token and populating the authentication context in cache and/or database 115 can include converting the authentication context to an encrypted cookie associated to the browser 113. A cookie (e.g., a browser cookie or Hypertext Transport Protocol (HTTP) cookie) is generally a small piece of text stored on a user device by, for instance, a web browser or other application. A cookie consists of one or more name-value pairs containing limited bits of information such as user preferences, shopping cart contents, an identifier for a server-based session, or other data used by websites and the application servers 103.

In one embodiment, the client applications 111 can include applications that run on run time environments, such as Java Runtime, Web Runtime (WRT), etc. Also, although various embodiments are explained with respect to browser 113 as a client application that is not directly linked to the DE 109, it is contemplated that other client applications that do not directly utilize the DE 109 can be used (e.g., other native client applications).

Also, by way of example, the authentication server 107 can include a single sign-on (SSO) authentication server. Single sign-on is an authentication process that enables a user (e.g., a user device, a client application, user of a user device, etc.) to authenticate once and gain access to resources of multiple software, applications, servers, etc., without being prompted to authenticate itself again at each of the resources. Therefore, when a client application (such as one of client applications 111 and/or browser 113) and/or a user of the client application is authenticated with the authentication server 107, for example, as discussed above, to access one of the application servers 103, the client application (and/or the user) can access other application servers (which are supported by the single sign-on scheme) during one session connected to the network, without redundant entry by, for example, the user of the user identification or authentication information. According to this example, the interface DE 109 can be implemented as an SSO authentication enabler to advantageously share authentication session information between different client applications (e.g., client applications 111 and/or browser 113) of the UE 101.

As discussed above, when the interface DE 109 receives an authentication request from one of client applications 111, such as client application 111*b*, the DE 109 determines whether an authentication process has already been performed for the client applications 111. For example, the DE 109 determines whether the authentication context already exists, has not expired, or is otherwise valid for authentication other client applications 111. If the DE 109 determines that the authentication process has already been performed, the DE 109 informs the client application 111*b* of the outcome of the authentication process. For example, the DE 109 generates and initiates transmission of a message to the client application 111b to inform the client application 111b of a successful or failed authentication attempt. If the DE 109 determines that the authentication context exists (and for example, is not outdated), the authentication context is retrieved from, for example, the cache and/or authentication database 117 and is returned to the client application 111b. Therefore, the interface DE 109 implements single sign-in functionality by caching and/or storing the authentication context and retrieving it for requesting client applications. The client application 111b can use the retrieved authentication context to connect to, for example, the application server 103a. In one example, the connection request from the client application 111b to the application server 103a can include the retrieved authentication context. The application server 103a can utilize the authentication server 107 to verify the authentication context and allow access by the client application 111b if the authentication context is verified. In one embodiment, the verification of the authentication context can include a verification message (that for example includes the authentication context) from the application server 103a to the authentication server 107, verification of the authentication context at the authentication server 107 (for example, by comparing the received authentication context with the stored authentication contexts), and a verification message from the authentication server 107 to the application server 103a indicating the result of the verification.

In one embodiment, after a client application 111 has been authenticated (e.g., received a valid authentication context), the received authentication context can be cached in, for instance, the database 117 which has a direct link to the DE 109. The DE 109 can then populate the authentication context to the database 115 that is directly accessible by the browser 113. This population of the authentication context from the database 117 to the database 115 advantageously enables the DE 109 share an authentication context (e.g., an SSO authentication context) with another application such as the browser 113 that would otherwise have no direct link to the authentication context via the DE 109. In this way, the system 100 also advantageously reduces the use of computing resources, network resources (e.g., bandwidth), power resources, etc. of the UE 101 and/or the communication network 105 by enabling sharing of an authentication context among different client applications 111 for accessing previously authenticated servers (e.g., the application servers 103).

For example, the browser 113 may desire to access one or more of the application servers 103 (e.g., application server 103a). In this example, the browser 113 generates and initiates transmission of an access request to the application server 103a. Since the client applications 111 have been authenticated, an authentication context has been received and cached and/or stored, and a populated authentication context exists for the browser 113 in, for example, cache and/or database 115, the access request can include the populated authentication context. Therefore, the authentication session information can be shared between different client applications and no further entry of, for example, user credentials for further authentication is necessary. As mentioned, the populated authentication context can be a copy of the authentication context, a converted version of the authentication context, etc.

By way of example, the application server 103a that receives the access request, can also generate and initiate transmission of a verification request to verify the received populated authentication context. The verification request is sent to the authentication server 107. The authentication server 107 verifies the validity of the authentication context, for example, by comparison with stored authentication contexts. The authentication server 107 generates and initiates transmission of a verification response based, at least in part, on the verification of the populated authentication context. If the authentication context is valid, the access request is granted.

According to certain embodiments, DE 109 can also determine whether an authentication context is stored or otherwise available in a cache and/or database (such as database 115) associated with the browser 113. If the authentication is available in the database 115, the DE 109 can retrieve the authentication context to populate the authentication context in the cache and/or database (such as authentication database 117) associated with the client applications 111. In one embodiment, this process can be called the pull method for populating the authentication context to the database 117.

In another example, the browser 113 may desire to access one or more of the application servers 103 (for example application server 103a). If the browser 113, a user of the browser 113, UE 101, a user of UE 101, or a combination thereof has not already been authenticated to access the application server 103a (e.g., no valid authentication context is stored in the database 115 associated with the browser 113), the browser 113 can be directed to the authentication server 107 for authentication. In one embodiment, the browser 113 receives a request for user credentials, for example, from the authentication server 107 and, in response, sends the user credentials to the authentication server 107. In this example, the authentication server 107 can determine the validity of user credentials by, for example, a comparison of the presented credentials against stored credentials. It is contemplated that any other authentication mechanism can be implemented to ensure that only authorized users are able to access the application servers 103. If the browser 113, a user of the browser 113, UE 101, a user of UE 101, or a combination thereof is authenticated, the authentication server 107 can generate and transmit an authentication context to the browser 113. The browser 113 can then store the received authentication context in the database 115 of the browser 113. Further access requests to application servers 103 by the browser 113 can be authenticated using the cached authentication context.

In certain embodiments, DE 109 can also populate the authentication context stored in the database 115 that is directly accessible by the browser 113 to a cache and/or database (e.g., database 117) that is associated with the client applications 111. In one embodiment, DE 109 can determine that an authentication context associated to the browser 113 is available and can populate the authentication context to the authentication database 117 to be used by client applications 111. More specifically, the authentication of the browser 113, a user of the browser 113, UE 101, a user of UE 101, or a combination thereof can be through the DE 109, therefore, the DE 109 can determine existence of the authentication context for the browser 113. This population of the authentication context from the database 115 to the database 117 advantageously enables the DE 109 share an authentication context (e.g., an SSO authentication context) with other applications such as the client applications 111 that would otherwise have no direct link to the database 115.

As discussed, in one example, populating the authentication context between the databases 115 and 117 can include copying the authentication context from the authentication database 115 to the database 117. Additionally or alternatively, populating the authentication context can include converting the authentication context received for the browser 113 to another authentication context based, at least in part, on an authentication protocol associated with, for example, the client applications 111 and caching and/or storing the converted authentication context in the authentication cache and/or database 117. In one embodiment, the authentication context that was generated for the browser 113 can be a cookie-based authentication context (for example, but not limited to, an encrypted cookie). In one example, populating the authentication context from database 115 to authentication database 117 can include converting the cookie-based authentication context to a token-based authentication context.

As discussed previously, implementing a platform to share authentication context between, for example, client applications 111 and the browser 113 can advantageously reduce communication load on the authentication server 107 by reducing number of authentication requests generated by the client applications 111 and the browser 113 that is destined for the authentication server 107.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the application servers 103a-103n, and the authentication server 107, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

It is noted that although FIG. 1 illustrates the application servers 103 and the authentication server 107 as separate entities, it is contemplated that any combination of these servers can be implemented such that the functions of these components may be combined in one or more components or performed by other components of equivalent functionality. Also, it is contemplated that the client applications 111, browser 113, and DE 109 can be distributed on different devices and/or equipment and the authentication context can be shared using a communication network.

In one embodiment, the client applications 111 and the browser 113 interact with the application servers 103 according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
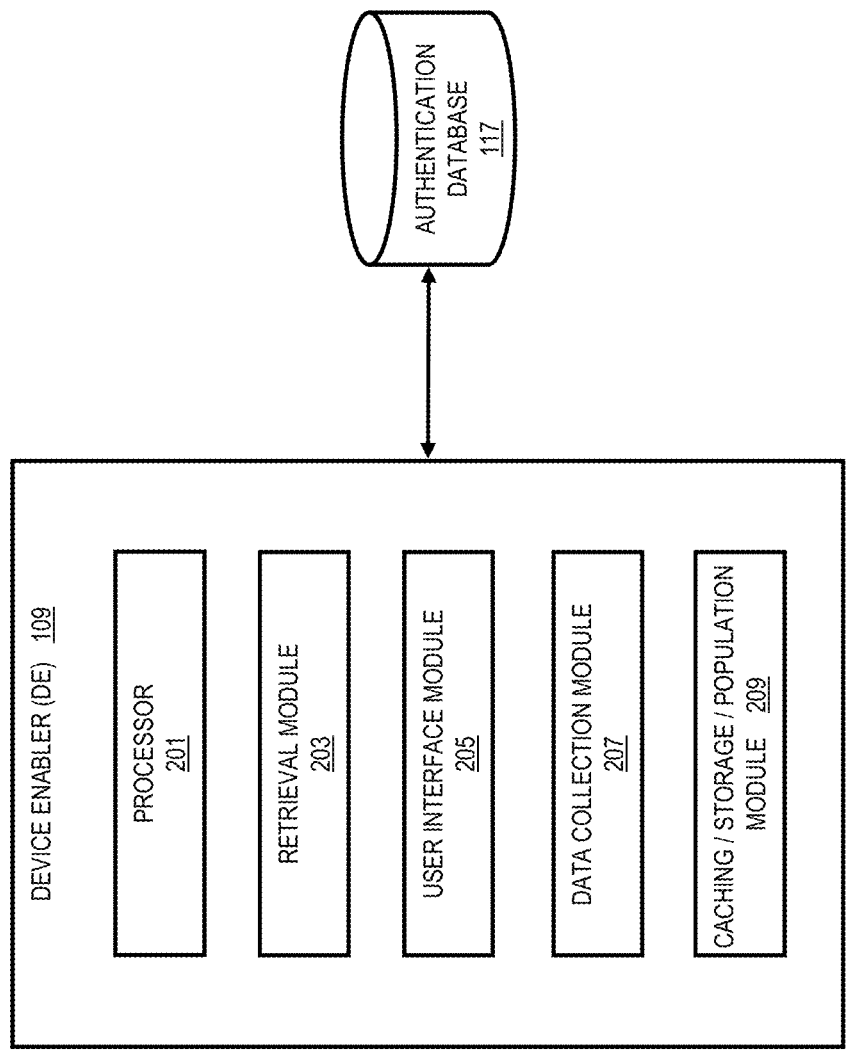
FIG. 2 is a diagram of the components of a device enabler, according to one embodiment.

FIG. 2 is a diagram of the components of a device enabler, according to one embodiment. By way of example, the device enabler (DE) 109 can include one or more components for providing a platform to share authentication session information, such as authentication context, between different applications such as client applications running on run time environments and client applications such as browsers. It is contemplated that the functions of these components may be combined in one or more components or performed by other components of equivalent functionality. In this embodiment, the DE 109 can include a processor 201 or other logic for executing at least one algorithm for performing the functions of the DE 109. For example, when the DE 109 is accessed by one of the client applications 111 of FIG. 1 for authentication, the processor 201 in communication with the retrieval module 203, determines whether an authentication procedure has already been processed for the client application (and/or related client applications). For example, the retrieval module 203 can determine whether an authentication context exists for the client application requesting authentication. In one example, the retrieval module 203 can query the authentication database 117 to determine if the authentication context is available. Additionally, the retrieval module 203 can further determine if the authentication context is still valid, for example, if it has not expired.

If the processor 201 in communication with the retrieval module 203 determines that a valid authentication context is available for the requesting client application, the retrieval module 203 retrieves the authentication context from a cache and/or a database such as the authentication database 117 and initiates transmission of the authentication context to the client application 111 requesting authentication. However, if the retrieval module 203 determines that an authentication procedure has already been processed by the DE 109 for the client application, which resulted in a failed authentication, the failed authentication result is further provided to the client application.

Alternatively, according to certain embodiments, if the retrieval module 203 determines that no valid authentication context exists for the client application that requested authentication, user interface module 205 is invoked to launch a user interface (UI) to prompt a user of the client application 111 to provide authentication and/or identification information, such as user credentials. Data collection module 207 can collect the user authentication information and prepare an authentication request message to be sent to an authentication server, such as authentication server 107 of FIG. 1. The authentication server 107 can verify the user authentication information and generate an authentication context if the user and/or the client application is authorized or otherwise validated. In one example, the user information can include user credentials such as username and password and the authentication server 107 can compare the user credentials with stored credentials to authenticate the user and/or client application. Data collection module 207 can receive the authentication context from the authentication server 107. Further, the data collection module 207 can receive a failed authentication message from the authentication server 107 if the user information is not valid. The result of the authentication request (authentication context or failed authentication message) is conveyed to the client application.

According to certain embodiments, if the authentication is successful and the authentication context is received by, for example, the data collection module 207, the caching/storage/population module 209 can cache and/or store the authentication context in, for example, the authentication database 117. Therefore, the authentication context can be used by, for example, the retrieval module 203 for authenticating subsequent requests from the same and/or other client applications associated with the DE 109. Further, the caching/storage/population module 209 can advantageously initiate population of the authentication context in another cache and/or database that is not directly linked with and/or utilizes the DE 109. For example, the caching/storage/population module 209 can populate the received authentication context in database 115 of FIG. 1 associated with the browser 113 of FIG. 1. Therefore, browser 113 of FIG. 1 can use the populated authentication context to access application servers 103 of FIG. 1 without a need to first authenticate itself with the authentication server 107. As mentioned, the caching/storage/population module 209 can populate the authentication context by copying it, converting it based, at least in part, on an authentication scheme supported by, for example, browser 113 of FIG. 1, etc.

Figure 3:
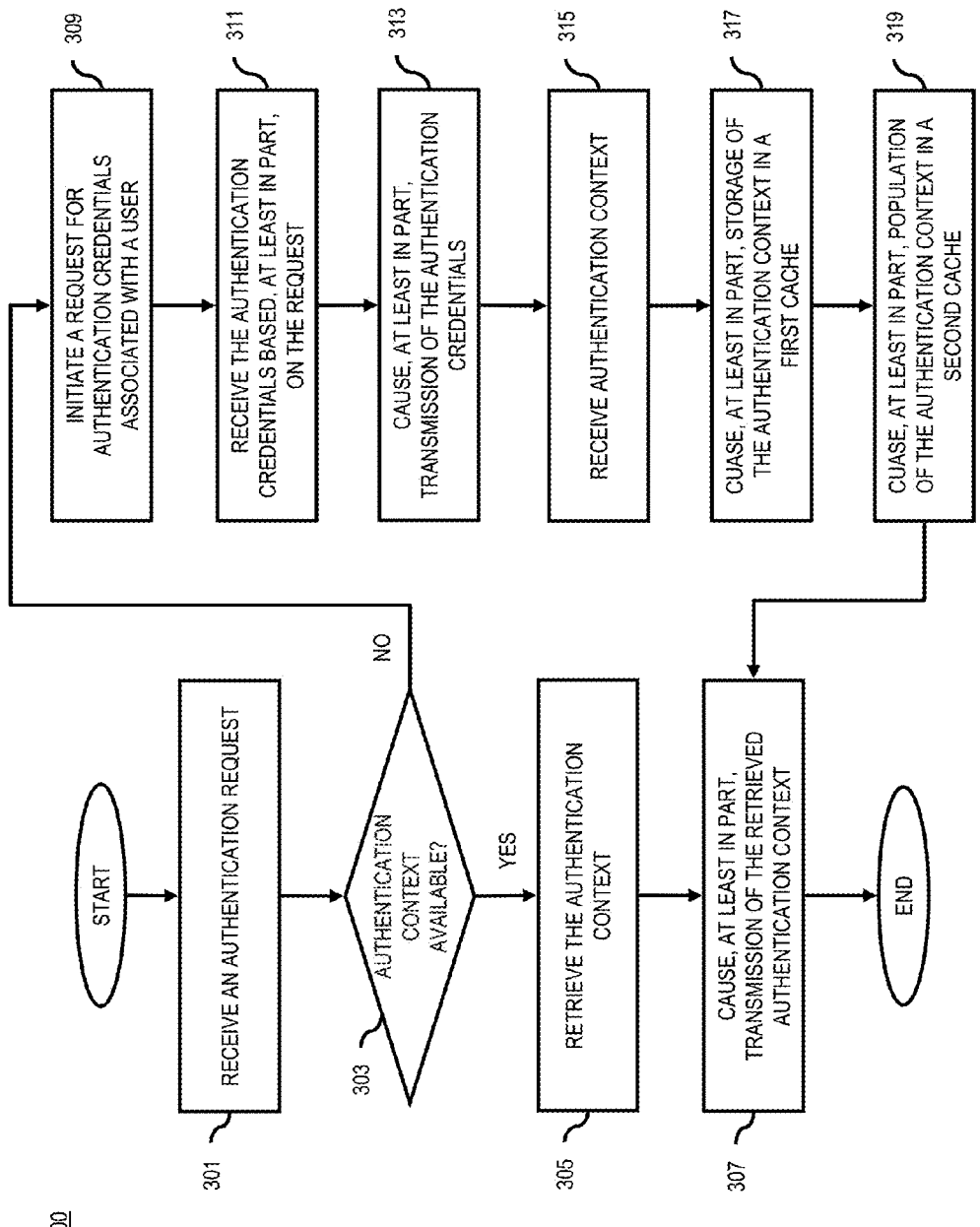
FIG. 3 is a flowchart of a process for sharing authentication session information, such as authentication context, between different applications, according to one embodiment.

FIG. 3 is a flowchart of a process for sharing authentication session information, such as authentication context, between different applications (such as client applications running on run time environments and client applications such as browsers), according to one embodiment. In one embodiment, the device enabler (DE) 109 of FIG. 1 performs the process 300 and is implemented in, for instance, a chip set including a processor and a memory as shown in FIG. 7.

In step 301, an authentication request is received. In one embodiment, the authentication request is received from a client application (such as client applications 111a-111m of FIG. 1) that is directly linked with and/or utilizes the DE 109. The authentication request can include information associated with the client application, a user of the client application, etc. In step 303, a determination is made regarding whether an authentication context already exists for the client application requesting authentication. In one example, the determination can be based on generating a query to a database, such as authentication database 117, to determine whether an authentication context associated with the client application was previously received and stored in the database 117. Additionally, according to certain embodiments, if the authentication context exists, in step 303 a determination can be made whether the authentication is valid, for example, if it has not expired. If a (valid) authentication context is available, in step 305 the authentication context is retrieved from, for example, a cache and/or a database, such as the authentication database 117 of FIG. 1. In step 307, the retrieved authentication context is transmitted to the client application requesting authentication. The client application can use the authentication context to access network services such as application servers 103 of FIG. 1.

However, if in step 303 it is determined that a valid authentication context is not available, a request to receive authentication credentials associated with a user of the client application, which requests authentication, is generated in step 309. In one example, a user interface is initiated to prompt the user for authentication credentials, such as username, password, one time password, biometrics, etc. In step 311, the authentication credentials are received from the client application based, at least in part, on the request.

In step 313, an authentication message is generated based, at least in part, on the received authentication credentials and the authentication message is transmitted to an authentication server, such as authentication server 107 of FIG. 1. The authentication server validates the authentication credentials (for example, by comparing it to stored credentials) to determine whether the user and/or the client application is authorized. In step 315, the result of the user and/or client authentication is received. More specifically, if the user and/or the client application are authorized, in step 315, an authentication context is received. In step 317, the authentication context is cached and/or stored in a cache and/or a database associated with the DE 109 such as the authentication database 117 of FIG. 1. The cached and/or stored authentication context can be further used by other client applications, which, for example, are directly linked with and/or utilize the DE 109.

In step 319, the authentication context is further populated in a second cache and/or database, which is not directly linked with and/or utilizes the DE 109, for example, the database 115 of FIG. 1. In one example, the database 115 can be a cookie store associated with the browser 113 of FIG. 1. As mentioned, in one embodiment, in step 319, the population of the authentication context can include converting the authentication context based, at least in part, on an authentication scheme associated with the client application associated with the second cache and/or database. For example, the authentication context can include a token and in step 319 the authentication context is converted to a converted authentication context that include a cookie encrypted using username and password of the user.

Figure 4A:
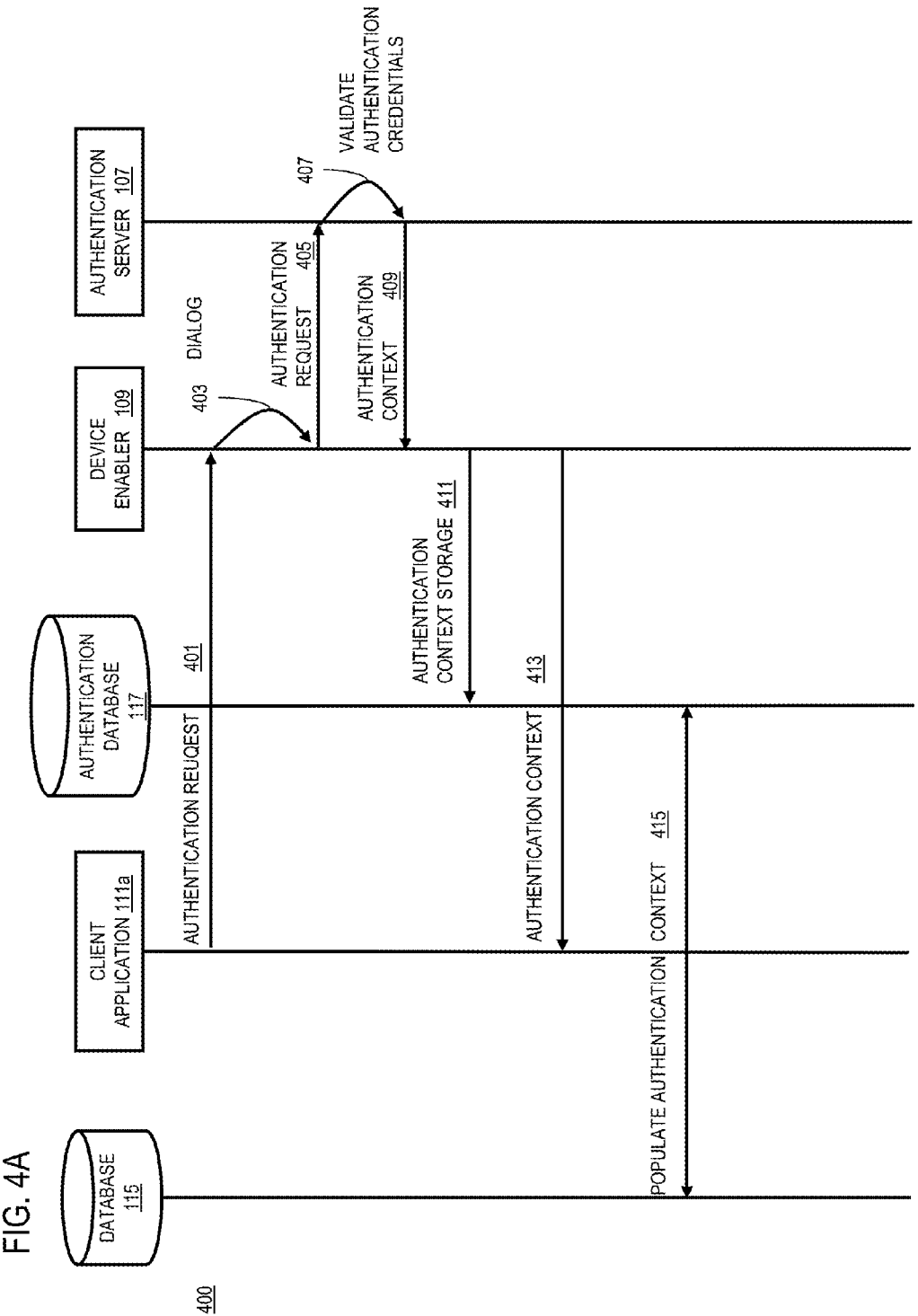
FIGS. 4A and 4B are time sequence diagrams that illustrates a sequence of messages and processes for providing a platform to share authentication session information, according to various embodiments.
Figure 4B:
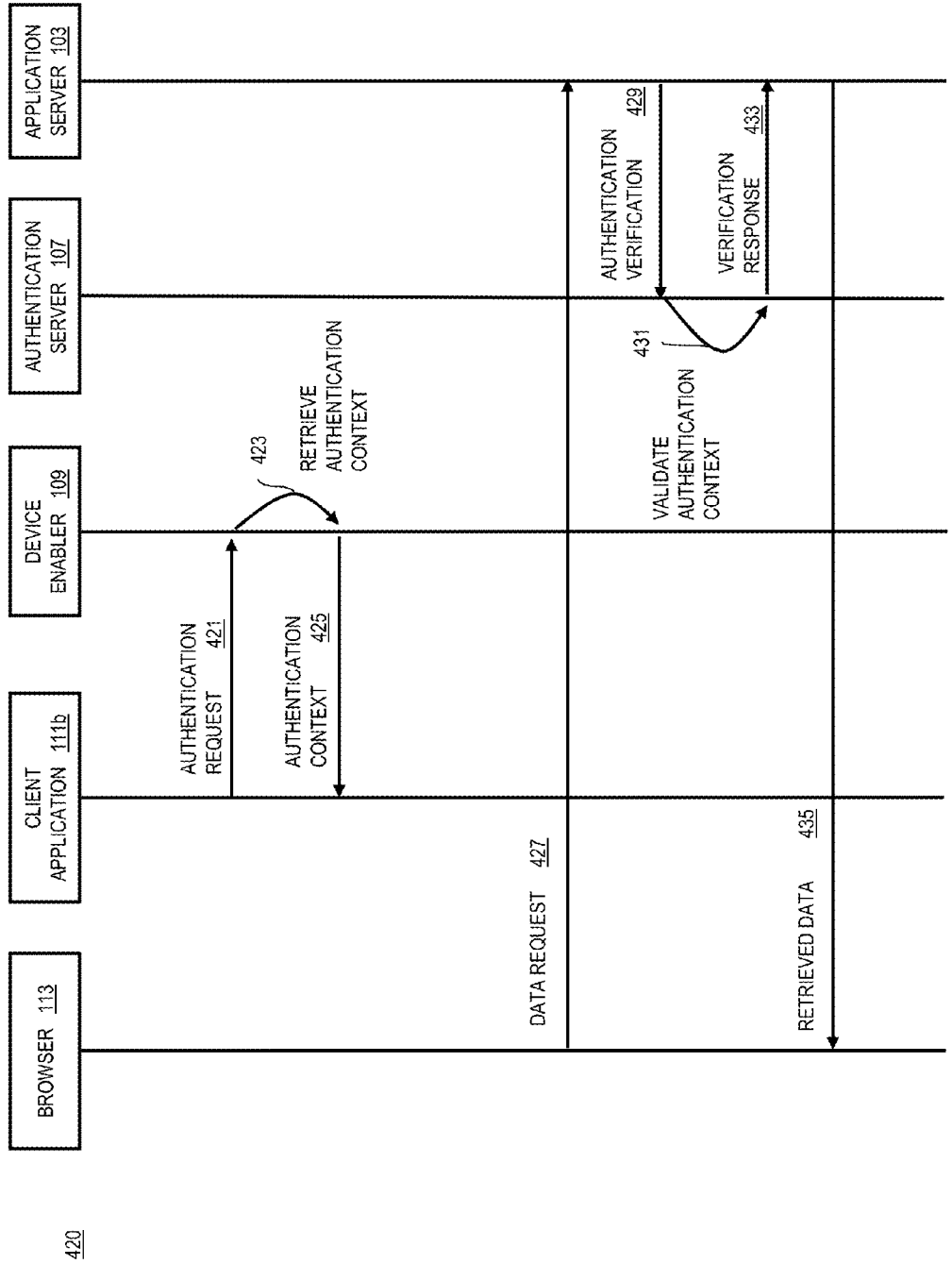

FIGS. 4A and 4B are time sequence diagrams that illustrate a sequence of messages and processes for providing a platform to share authentication session information, according to various embodiments. A network process is represented by vertical line. A message passed from one process to another is represented by horizontal arrows. A step performed by a process is indicated by the text. The processes represented in FIGS. 4A and 4B are the application servers 103, the authentication server 107, the device enabler (DE) 109, the client applications 111, the browser 113, the database 115, and the authentication database 117. The example of FIG. 4A discusses the process 400 of authenticating a client application and/or a user of the client application, receiving authentication context, storing the authentication context in a first cache and/or database, and populating the authentication context in a second cache and/or database. Also, the example of FIG. 4B discusses the process 420 of requesting authentication by a client application and accessing an application server by the browser.

At 401 of process 400, one of the client applications 111 of FIG. 1, such as client application 111a initiates an authentication request to the device enabler (DE) 109. In one example, the authentication request can include information associated to the client application 111a, a user of the client application, an application server that the client application 111a desires to access, etc. At 403, the device enabler 109 initiates a dialog, such as a user interface (UI), to prompt the user for authentication credentials, if the DE 109 determines that the client application 111a has not already been authenticated. In one example, the determination is based, at least in part, on a search on a cache and/or a database associated with the DE 109 (such as the authentication database 117) to determine whether an authentication context associated with the client application 111a exists. During the dialog 403, the DE 109 can collect authentication credentials of, for example, a user of the client application 111a (and/or a user of the UE 101).

At 405, the DE 109 generates and transmits an authentication request to the authentication server 107 to validate the authentication credentials collected by the DE 109. In one example, the authentication request can include the authentication credentials and/or information associated to the credentials. By way of example, the credentials can include username, password, one time password, consumer key, secret key, biometrics, etc. At 407, the authentication server 107 verifies the authentication credentials to determine whether the client application and/or the user are authorized.

In one example, the received authentication credentials (or information associated to them) are compared with stored credentials. If authorized, at 409, an authentication context is conveyed to the DE 109. According to one embodiment, the authentication context can include a cookie or a token.

The DE 109, at 411, initiates caching and/or storage of the authentication context in a cache and/or a database that is directly linked to and/or utilizes the DE 109, such as authentication database 117. The cached/stored authentication context can be further used by client applications directly linked to and/or utilizing the authentication database 117 and/or DE 109. At 413, the DE 109 conveys the authentication context received from the authentication server 107 to the client application 111a that requested authentication. Further, at 415 the authentication context is populated at a cache and/or a database that is not directly linked with and/or utilizes the DE 109. In one example, the authentication context is populated from the authentication database 117 to database 115. As mentioned, according to certain embodiments, at 415, the authentication context is converted based, at least in part, on an authentication protocol associated with the client application (such as the browser 113) that utilizes the database 115. It is contemplated that the messages and/or processes illustrated can be combined in one or more messages and/or processes or performed in other sequences.

FIG. 4B illustrates exemplary processes of a client application (such as client application 111b) requesting authentication and a browser requesting access to an application server. At 421, the client application 111b sends an authentication request to the DE 109. In one example, the authentication request can include information associated with the client application 111b, a user of the client application 111b, etc. At 423, the authentication context associated with the client application 111b is retrieved and at 425 the retrieved authentication context is conveyed to the client application 425. According to certain embodiments, at 423, the DE 109 determines whether an authentication process has already been performed for the client application 111b and/or client applications (such as client applications 111) related to the client application 111b. In one example, the determination can be based, at least in part, on a query to the authentication database 117 of FIG. 1 to determine whether a valid authentication context is available. If no valid authentication context is available, process 400 of FIG. 4A can be performed. If the valid authentication context is available, it is retrieved and is conveyed to the client application 111b. The client application 111b can use the authentication context to, for example, access application servers 103 of FIG. 1.

FIG. 4B further illustrates steps 427 through 435 which describe an exemplary process of the browser 113 accessing the application server 103 using authentication context populated at 415 of FIG. 4A. At 427, the browser 113 sends a data request to the application server 103. The data request can include information related to the browser 113, the application server 103, the populated authentication context, etc. In an embodiment, the authentication context has been populated in, for example, a cache and/or database associated with the browser 113 in a process such as process 400 of FIG. 4A. In one example, the populated authentication context can be a cookie that is stored in a browser cookie store. The browser 113 can access the browser cookie store to retrieve the cookie and include it in the data request 427.

At 429 through 433, the application server 103 with the authentication server 107 verifies the validity of the populated authentication context. At 429, the application server 103 generates an authentication verification message and conveys the message to the authentication server 107. The authentication verification message can include the populated authentication context and/or information associated with it. At 431, the authentication server 107 verifies if the populated authentication context is valid. In one example, the authentication context 431 compares the authentication context (and/or information associated with it) to the authentication context (information associated with it, and/or authentication credentials of a user or client application) that was generated, for example at 407 of process 400 of FIG. 4A. At 433, the authentication server 107 sends a verification response to the application server 103 based, at least in part, on 431. If the populated authentication context is valid, at 435, the application server 103 returns the requested data to the browser 113.

Although the embodiments discussed are concerned with processes that authentication context is first generated for client applications running on run time environment and is populated for other applications, such as browsers (e.g., via a push method for sharing authentication contexts), however it is contemplated reverse process (e.g., via a pull method for sharing authentication contexts) can also be implemented. For example, a client application, such as a browser, can be authenticated against an authentication server (such as authentication server 107 of FIG. 1), an authentication context can be generated and be cached and/or stored in a first cache and/or database associated with the client application, and the authentication context can be further populated in a second cache and/or database for other client applications that are not directly linked with and/or utilize the first cache and/or database.

Figure 5:
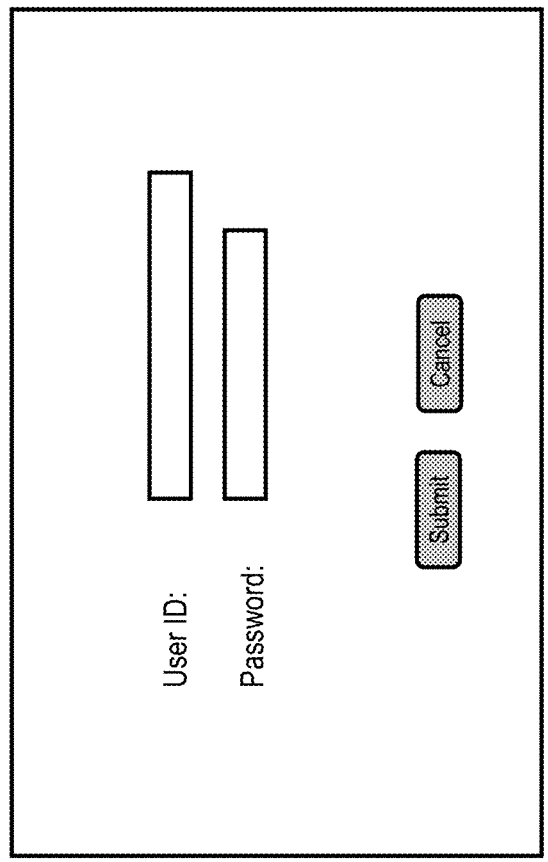
FIG. 5 is a diagram of an example user interface for providing data related to authentication credentials, according to one embodiment.

FIG. 5 is a diagram of an example user interface for providing data related to authentication credentials, according to one embodiment. As described previously, when the DE 109 of FIG. 1 receives an authentication request from one of the client applications 111 and determines that valid authentication context is not available, the DE can initiate a user interface (UI) to prompt a user of the client application for authentication credentials. FIG. 5 is a sample user interface 500 requesting such information. In this example, the user and/or the UE 101 can enter the user ID and password for authentication purposes. It is contemplated that the DE 109 may request any information for ensuring that only authorized users are able to access the requested services and/or information.

The processes described herein for providing a platform to share authentication session information, such as authentication context, between different applications may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
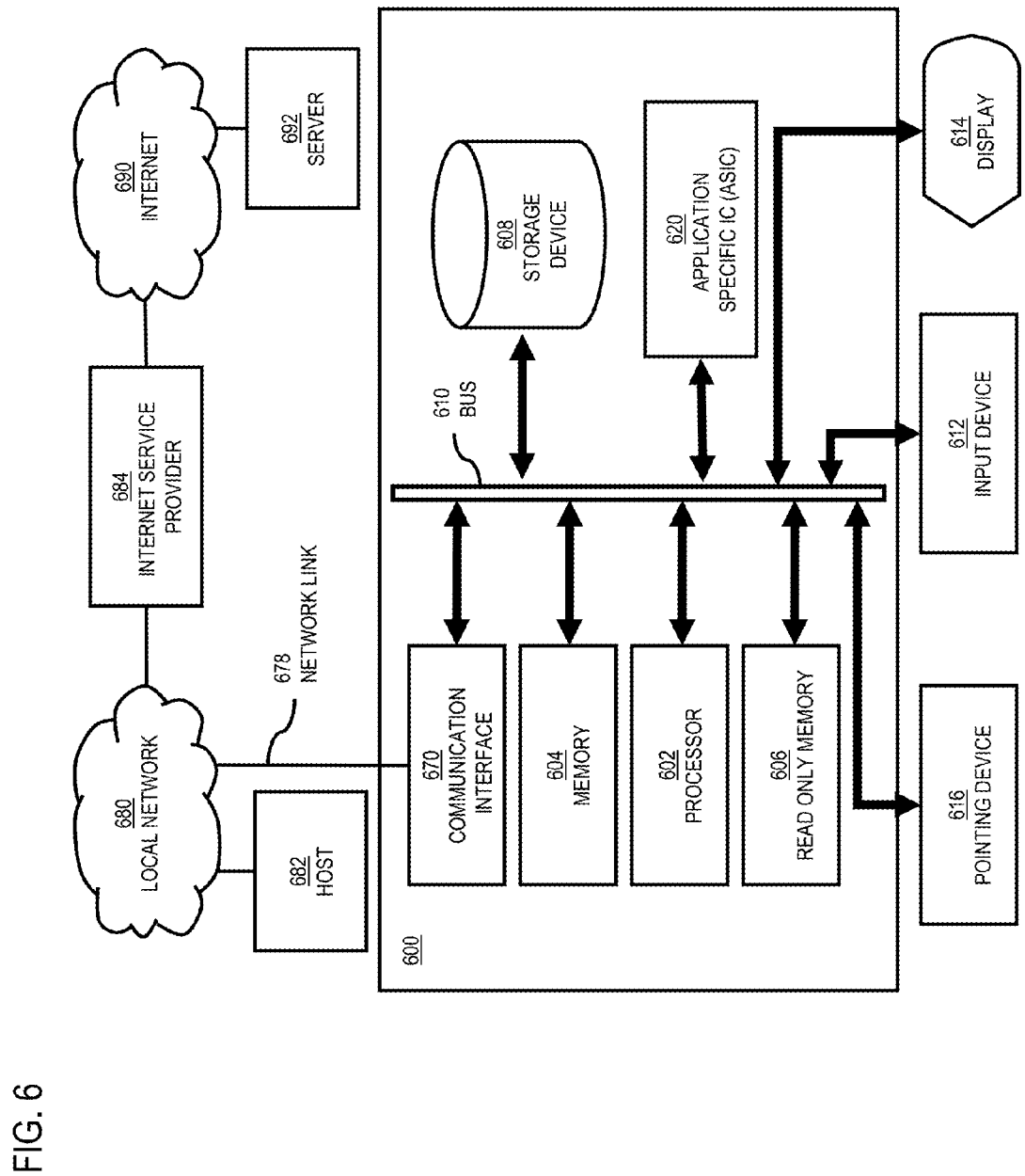
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide authentication session sharing as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing authentication session sharing.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing authentication session sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing authentication session sharing. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing authentication session sharing, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing authentication session sharing to the UE 101.

The term "computer-readable medium" as used herein to refer to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed to provide authentication session sharing as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of providing authentication session sharing.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide authentication session sharing. The memory 705 also stores the data associated with or generated by the execution of the inventive steps.

Figure 8:
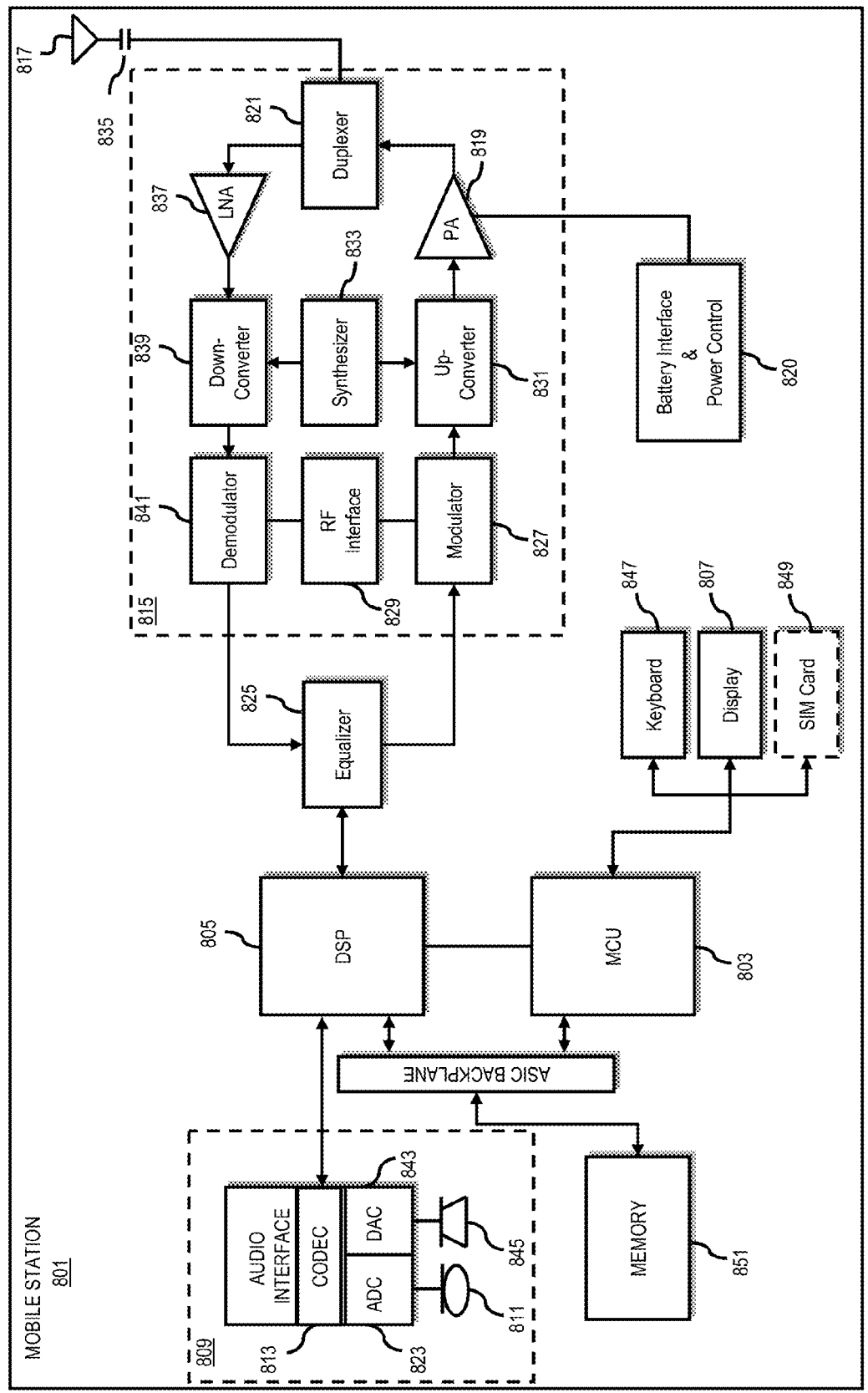
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of providing authentication session sharing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing authentication session sharing. The display 807 includes display circuitry configured to display at least a portion of a user interface of the mobile terminal (e.g., mobile telephone).

Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide authentication session sharing. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at an interface of a user device, an authentication context associated with a first service;
   initiating, by the user device, a storage of the authentication context in a first cache in the user device associated with the interface;
   converting, by the user device, the authentication context into a converted authentication context based, at least in part, on an authentication protocol associated with a second service, wherein when the authentication context is cookie-based, the converted authentication context is token-based, and when the authentication context is token-based, the converted authentication context is cookie-based; and initiating, by the user device, a population of the converted authentication context to a second cache in the user device associated with the second service, the second cache not directly linked to the interface.

2. The method of claim 1, wherein the cookie-based authentication context is used by a browser based application, and the token-based authentication context is executed in a run-time environment.

3. The method of claim 1, further comprising: receiving, from the first service, a request to authenticate a user; requesting authentication credentials associated with the user; receiving the authentication credentials based on the request; causing, at least in part, transmission of the authentication credentials to an authentication server, wherein the authentication context is received from the authentication server based, at least in part, on the authentication credentials.

4. The method of claim 1, wherein the authentication context is a single sign on authentication context applicable to both the first service and the second service.

5. The method of claim 1, wherein the first service and the second service are executing on a common device, and wherein the converted authentication context includes a cookie derived from a token and encrypted using a user name and a password.

6. The method of claim 1, wherein the user device is a mobile phone.

7. An apparatus comprising:
at least one processor; and
at least one memory including computer program code, the at least one memory and the computer program code configured to, with the at least one processor, cause the apparatus embedded in a user device to perform at least the following,
receive, at an interface of the user device, an authentication context associated with a first service;
initiate a storage of the authentication context in a first cache in the user device associated with the interface;
convert the authentication context into a converted authentication context based, at least in part, on an authentication protocol associated with a second service, wherein when the authentication context is cookie-based, the converted authentication context is token-based, and when the authentication context is token-based, the converted authentication context is cookie-based; and
initiate a population of the converted authentication context to a second cache in the user device associated with the second service, the second cache not directly linked to the interface.

8. The apparatus of claim 7, wherein the cookie-based authentication context is used by a browser based application, and the token-based authentication context is executed in a run-time environment.

9. The apparatus of claim 7, wherein the apparatus is further caused to: receive, from the first service, a request to authenticate a user; request authentication credentials associated with the user; receive the authentication credentials based on the request; cause, at least in part, transmission of the authentication credentials to an authentication server, wherein the authentication context is received from the authentication server based, at least in part, on the authentication credentials.

10. The apparatus of claim 7, wherein the authentication context is a single sign on authentication context applicable to both the first service and the second service.

11. The apparatus of claim 7, wherein the first service and the second service are executing on a common device, and wherein the converted authentication context includes a cookie derived from a token and encrypted using a user name and a password.

12. The apparatus of claim 7, wherein the user device is a mobile phone further comprising: user interface circuitry and user interface software configured to facilitate user control of at least some functions of the mobile phone through use of a display and configured to respond to user input; and the display and display circuitry configured to display at least a portion of a user interface of the mobile phone and also configured to facilitate user control of the at least some functions of the mobile phone.

13. A non-transitory computer-readable storage medium carrying one or more sequences of one or more instructions which, when executed by one or more processors, cause an apparatus embedded in a user device to at least perform the following steps:
receiving, at an interface of the user device, an authentication context associated with a first service;
initiating a storage of the authentication context in a first cache in the user device associated with the interface;
converting the authentication context into a converted authentication context based, at least in part, on an authentication protocol associated with a second service, wherein when the authentication context is cookie-based, converted authentication context is token-based, and when the authentication context is token-based, the converted authentication context is cookie-based; and
initiating a population of the converted authentication context to a second cache in the user device associated with the second service, the second cache not directly linked to the interface.

14. The non-transitory computer readable storage medium of claim 13, wherein the cookie-based authentication context is used by a browser based application, and the token-based authentication context is executed in a run-time environment.

15. The non-transitory computer readable storage medium of claim 13, wherein the apparatus is caused to further perform: receiving, from the first service, a request to authenticate a user; requesting authentication credentials associated with the user; receiving the authentication credentials based on the request; causing, at least in part, transmission of the authentication credentials to an authentication server, wherein the authentication context is received from the authentication server based, at least in part, on the authentication credentials.

16. The non-transitory computer readable storage medium of claim 13, wherein the authentication context is a single sign on authentication context applicable to both the first service and the second service.

17. The non-transitory computer readable storage medium of claim 13, wherein the first service and the second service are executing on a common device and wherein the converted authentication context includes a cookie derived from a token and encrypted using a user name and a password.

* * * * *